United States Patent
Nakai et al.

(10) Patent No.: US 9,865,878 B2
(45) Date of Patent: Jan. 9, 2018

(54) ENERGY STORAGE DEVICE

(71) Applicant: GS Yuasa International Ltd., Kyoto-shi, Kyoto (JP)

(72) Inventors: Kenta Nakai, Kyoto (JP); Akihiko Miyazaki, Kyoto (JP); Tomonori Kako, Kyoto (JP); Sumio Mori, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 15 days.

(21) Appl. No.: 15/072,506

(22) Filed: Mar. 17, 2016

(65) Prior Publication Data

US 2016/0276667 A1    Sep. 22, 2016

(30) Foreign Application Priority Data

Mar. 20, 2015    (JP) ................. 2015-058295

(51) Int. Cl.
| | |
|---|---|
| *H01M 4/00* | (2006.01) |
| *H01M 4/587* | (2010.01) |
| *H01M 4/131* | (2010.01) |
| *H01M 10/0525* | (2010.01) |
| *H01G 11/24* | (2013.01) |
| *H01G 11/52* | (2013.01) |

(Continued)

(52) U.S. Cl.
CPC ............ *H01M 4/587* (2013.01); *H01G 11/24* (2013.01); *H01G 11/52* (2013.01); *H01G 11/58* (2013.01); *H01M 4/131* (2013.01); *H01M 10/0525* (2013.01); *H01M 2004/021* (2013.01); *H01M 2004/027* (2013.01); *H01M 2220/20* (2013.01); *Y02T 10/7011* (2013.01)

(58) Field of Classification Search
CPC ...... H01M 4/131; H01M 4/483; H01M 4/485; H01M 4/5825; H01M 10/0525; H01M 4/662; H01M 4/661; H01M 4/0459; H01M 4/0421; H01M 4/0404; H01M 2004/027; H01M 10/054
See application file for complete search history.

(56) References Cited

U.S. PATENT DOCUMENTS

2012/0251878 A1    10/2012    Ueki
2013/0040229 A1*    2/2013    Grigorian ........... H01M 4/0402
                                                                            429/532

(Continued)

FOREIGN PATENT DOCUMENTS

| EP | 1890348 A1 | 2/2008 |
|---|---|---|
| JP | 2005267953 A2 | 9/2005 |

(Continued)

OTHER PUBLICATIONS

Extended European Search Report dated Jun. 28, 2016 issued in the corresponding European patent application No. 16160343.6.

*Primary Examiner* — Mark F Huff
*Assistant Examiner* — Monique Wills
(74) *Attorney, Agent, or Firm* — Rankin, Hill & Clark LLP

(57) ABSTRACT

An energy storage device includes a positive electrode, a negative electrode, and a nonaqueous electrolyte solution. The negative electrode includes an active material layer, and the active material layer has pores having a pore size of 0.1 μm or more and 1.0 μm or less, and a total volume of the pores is 0.26 cm$^3$/g or more and 0.46 cm$^3$/g or less.

10 Claims, 5 Drawing Sheets

(51) Int. Cl.
*H01G 11/58* (2013.01)
*H01M 4/02* (2006.01)

(56) References Cited

U.S. PATENT DOCUMENTS

| 2013/0122349 | A1 | 5/2013 | Iwasaki |
| 2014/0370393 | A1 | 12/2014 | Kako |
| 2015/0093647 | A1 | 4/2015 | Mori |
| 2016/0006034 | A1 | 1/2016 | Utaka |
| 2016/0344030 | A1* | 11/2016 | Sakshaug ............... H01G 11/26 |

FOREIGN PATENT DOCUMENTS

| JP | 2010-098020 A * | 4/2010 | ............ H01G 9/058 |
| JP | 2010098020 A2 | 4/2010 | |
| JP | 2012064544 A2 | 3/2012 | |
| JP | 2015026607 A2 | 2/2015 | |
| JP | 2015092461 A2 | 5/2015 | |
| WO | 2011036797 A1 | 3/2011 | |
| WO | 2014156892 A1 | 10/2014 | |

* cited by examiner

ENERGY STORAGE DEVICE

CROSS-REFERENCE TO RELATED APPLICATIONS

This application claims the benefit of Japanese patent application No. 2015-058295 filed on Mar. 20, 2015, which is incorporated by reference.

FIELD

The present invention relates to an energy storage device including a positive electrode, a negative electrode and a nonaqueous electrolyte solution.

BACKGROUND

In recent years, demands for hybrid automobiles and electric automobiles are expanding. Various energy storage devices such as a lithium ion secondary battery are widely used in the hybrid automobiles and electric automobiles. An increase of a power is required of the energy storage device. JP-A-2012-64544 discloses to use a non-graphitizable carbon as an active material of a negative electrode concerning this type of energy storage device. A power of the energy storage device can be increased by using, as a negative active material, a non-graphitizable carbon formed into particles having a small particle size. However, there is a demand to exert adequate durability when the non-graphitizable carbon formed into particles having a small particle size is used as a negative active material.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an energy storage device having a high power and high durability.

An energy storage device according to an aspect of the present invention includes a positive electrode, a negative electrode, and a nonaqueous electrolyte solution, wherein the negative electrode includes an active material layer containing a non-graphitizable carbon, the active material layer has pores having a pore size of 0.1 μm or more and 1.0 μm or less, and a total volume of the pores is 0.26 cm$^3$/g or more and 0.46 cm$^3$/g or less.

BRIEF DESCRIPTION OF DRAWINGS

The foregoing and other features of the present invention will become apparent from the following description and drawings of an illustrative embodiment of the invention in which.

DESCRIPTION OF EMBODIMENTS

An energy storage device according to an aspect of the present invention includes a positive electrode, a negative electrode, and a nonaqueous electrolyte solution, wherein the negative electrode includes an active material layer containing a non-graphitizable carbon, the active material layer has pores having a pore size of 0.1 μm or more and 1.0 μm or less, and a total volume of the pores is 0.26 cm$^3$/g or more and 0.46 cm$^3$/g or less.

The energy storage device exerts a high power and exhibits high durability.

Hereinafter, an energy storage device according to an embodiment of the present invention will be described with reference to FIG. 1 to FIG. 3.

Examples of energy storage device include a primary battery, a secondary battery and a capacitor.

In the present embodiment, a secondary battery capable of charging and discharging will be described as an example of the energy storage device.

In addition, the name of each constituent member (each component) of the present embodiment is a name in the present embodiment, and it may be different from the name of each constituent member (each component) in BACKGROUND.

The energy storage device of the present embodiment is a nonaqueous electrolyte secondary battery. Specifically, the energy storage device is a lithium ion secondary battery which utilizes electron transfer generated in association with transfer of lithium ions. This type of energy storage device supplies electric energy. The energy storage device is used singly or plurally. Specifically, the energy storage device is used singly when a required power and a required voltage are low. On the other hand, the energy storage device is used in an energy storage apparatus in combination with other devices when at least one of the required power and the required voltage is high. In the energy storage apparatus, the energy storage device used for the energy storage apparatus supplies electric energy.

Figure 1:
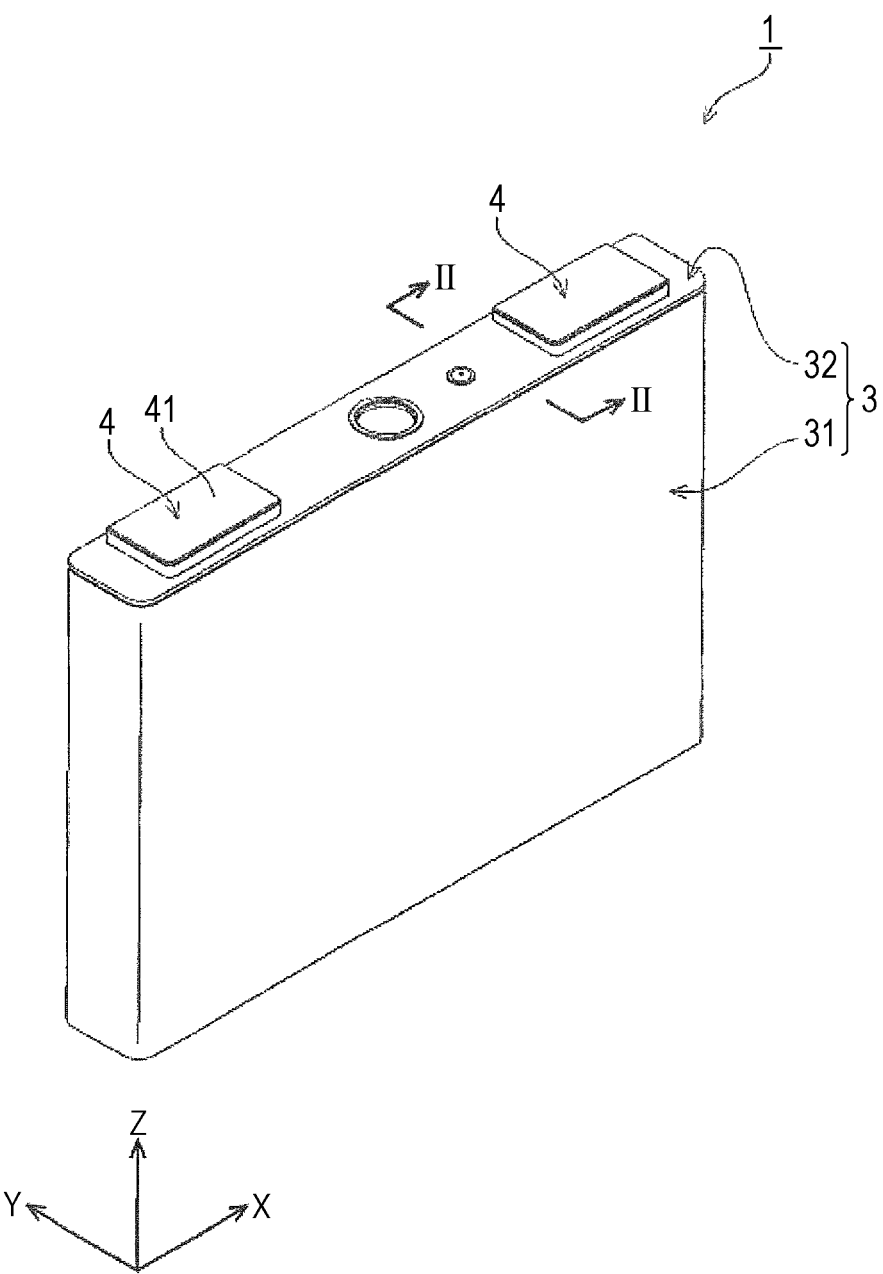
FIG. 1 shows a perspective view of an energy storage device according to an embodiment of the present invention.
Figure 2:
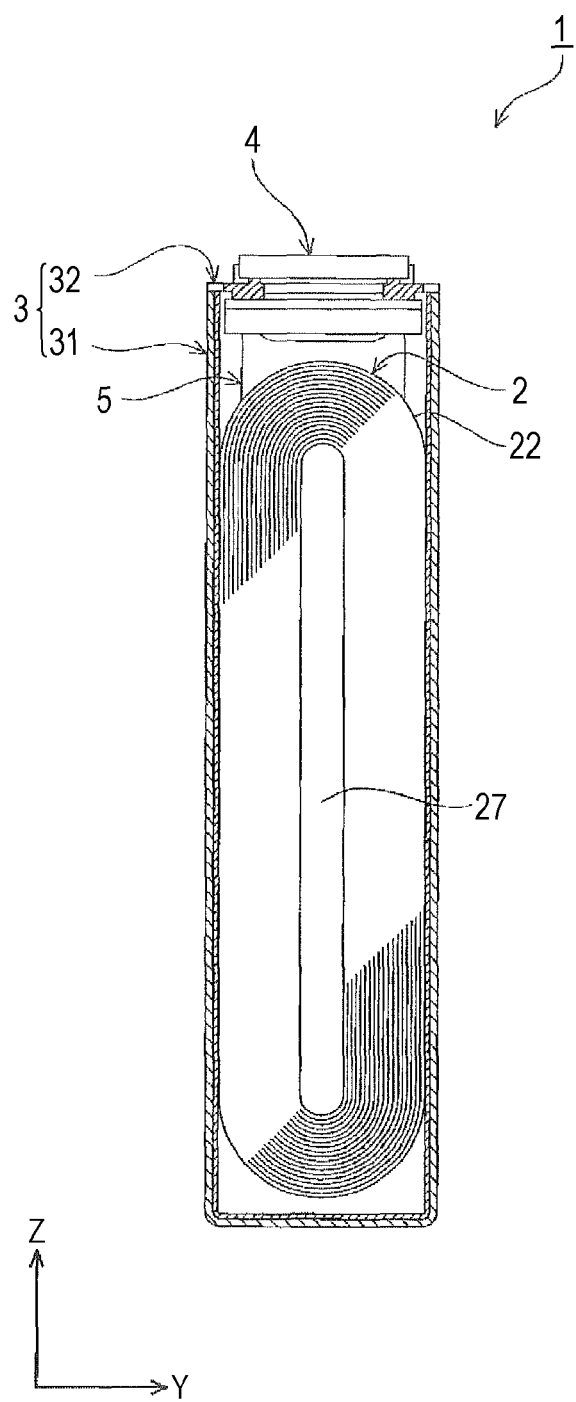
FIG. 2 shows a sectional view taken on line II-II of FIG. 1.
Figure 3:
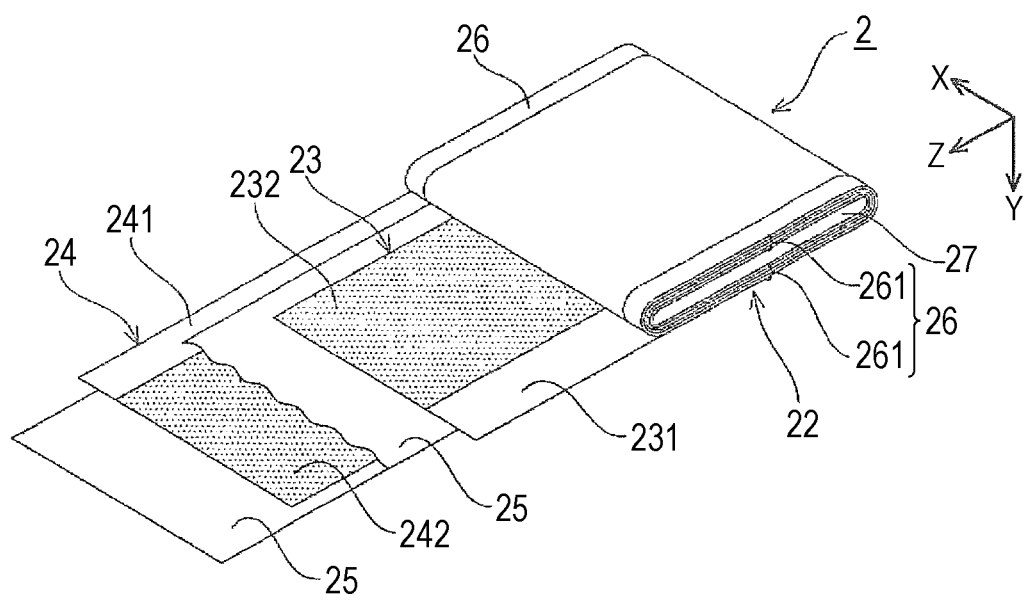
FIG. 3 is a view explaining a constitution of an electrode assembly of the energy storage device.

The energy storage device includes, as shown in FIGS. 1 to 3, an electrode assembly 2 including a positive electrode 23 and a negative electrode 24, a case 3 housing the electrode assembly 2, and external terminals 4 arranged at the outer side of the case 3 which are electrically connected to the electrode assembly 2. Further, the energy storage device 1 has a current collector 5 which provides electrical conduction between the electrode assembly 2 and external terminals 4.

The electrode assembly 2 is formed by winding a layered body 22 in which the positive electrode 23 and the negative electrode 24 are layered while being insulated from each other.

The positive electrode 23 has a metal foil and a positive active material layer formed on the metal foil. The metal foil is band-shaped. The metal foil of the present embodiment is, for example, an aluminum foil. The positive electrode 23 has an uncovered portion (section where the positive active material layer is not formed) 231 of the positive active material layer at one edge portion in a width direction which is a transverse direction of the band shape. In the positive electrode 23, a section in which the active material layer is formed, is referred to as a covered portion 232.

The positive active material layer has a positive active material and a binder.

The positive active material is, for example, a lithium metal oxide. Specific examples of the positive active material include composite oxides ($Li_aCo_yO_2$, $Li_aNi_xO_2$, $Li_aMn_zO_4$, $Li_aNi_xCo_yMn_zO_2$, etc.) represented by $Li_aMe_bO_c$ (Me represents one or two or more transition metals), and polyanion compounds ($Li_aFe_bPO_4$, $Li_aMn_bPO_4$, $Li_aMn_bSiO_4$, $Li_aCo_bPO_4F$, etc) represented by $Li_aMe_b(XO_c)_d$ (Me represents one or two or more transition metals and X represents, for example, P, Si, B, V). The positive active material of the present embodiment is $LiNi_{1/3}Co_{1/3}Mn_{1/3}O_2$.

Examples of the binder used in the positive active material layer include polyvinylidene fluoride (PVDF), a copolymer of ethylene and vinyl alcohol, polymethyl methacrylate, polyethylene oxide, polypropylene oxide, polyvinyl alcohol, polyacrylic acid, polymethacrylic acid, and styrene-butadiene rubber (SBR).

The positive active material layer may further have a conducting agent such as Ketjen Black (registered trademark), acetylene black and graphite. The positive active material layer of the present embodiment has acetylene black as the conducting agent.

The negative electrode 24 has a metal foil and a negative active material layer formed on the metal foil. The metal foil is band-shaped. The metal foil of the present embodiment is, for example, a copper foil. The negative electrode 24 has an uncovered portion (section where the negative active material layer is not formed) 241 of the negative active material layer at the other edge portion (side opposite to the uncovered portion 231 of the positive electrode 23) in a width direction which is a transverse direction of the band shape. A width of a covered portion (section where the negative active material layer is formed) 242 of the negative electrode 24 is larger than that of a covered portion 232 of the positive electrode 23.

The negative active material layer has a negative active material and a binder.

In the negative active material layer, a packing density of the active material is preferably 0.9 g/cm³ or more and 1.04 g/cm³ or less.

The lithium ion secondary battery of the present embodiment can exert a high power and high durability by having such a negative active material layer.

The negative active material is a non-graphitizable carbon (hard carbon).

A peak of a pore distribution curve measured by a mercury intrusion method of the active material layer containing the non-graphitizable carbon, is present in the range of 0.1 µm or more and 1.0 µm or less.

That is, the majority of the pores of the active material layer containing the non-graphitizable carbon have a pore size of 0.1 µm or more and 1.0 µm or less.

In the active material layer, the total volume of the pores having a pore size of 0.1 µm or more and 1.0 µm or less, is 0.26 cm³/g or more and 0.46 cm³/g or less.

In the negative electrode, a surface coating grows gradually with an increase of an operating time of a battery.

In this time, since growth of the surface coating proceeds also in a pore portion within the active material layer, the pores are filled with the coating to inhibit a diffusion of the electrolyte solution.

However, inhibition of the diffusion of the electrolyte solution can be suppressed since the total volume of the pores of the active material layer is 0.26 cm³/g or more.

Accordingly, the battery has high durability since the total volume is 0.26 cm³/g or more.

It is suppressed that structural resistance of the negative active material layer becomes too large since the total volume of the pores of the negative active material layer is 0.46 cm³/g or less.

Accordingly, the battery exerts a high power since the total volume is 0.46 cm³/g or less.

The total volume of the pores having a pore size of 0.1 µm or more and 1.0 µm or less can be adjusted by the production conditions of negative electrode.

The negative active material layer is formed, for example, by forming a layer by an mixture containing a binder and a negative active material on the metal foil, and compacting the layer in a direction of thickness by pressing.

A value of the total volume can be decreased by increasing a pressing pressure, and contrariwise a value of the total volume can be increased by decreasing a pressing pressure.

The total volume can be measured by a mercury intrusion method.

When the total volume of a completed battery is measured, the total volume can be determined, for example, by a procedure in which a battery is discharged so that a negative potential is 1.0 V or higher, the battery is disassembled in a dry atmosphere, and the negative electrode is washed with dimethylcarbonate, then vacuum-dried for 2 hours or more, and measured by a mercury intrusion method after the vacuum-drying.

The non-graphitizable carbon preferably has a 90% cumulative diameter (D90) of 1.9 µm or more and 11.5 µm or less.

The 90% cumulative diameter (D90) is a particle size at which in a volume based particle size distribution, a cumulative volume of particles from a small particle reaches 90%.

The battery can exert a high power for a prolonged period since a 90% cumulative diameter (D90) of the non-graphitizable carbon is 1.9 µm or more and 11.5 µm or less.

The 90% cumulative diameter (D90) is measured, for example, by a laser diffraction and scattering method.

Specifically, the 90% cumulative diameter (D90) is measured using a laser diffraction/scattering type particle size distribution analyzer (MT3000EXII manufactured by MicrotracBEL Corp.) as a measuring apparatus and DMS (ver.2) which is an application software package exclusive to Microtrac as a measurement control software program. Specifically, a scattering type measurement mode is employed. A wet cell through which a dispersion liquid with a measurement object sample (non-graphitizable carbon) dispersed in a dispersive solvent is circulated, is put under an ultrasonic wave environment for 2 minutes. The wet cell is irradiated with laser light, to obtain a distribution of scattered light from the measurement sample. Then, the distribution of scattered light is approximated by a log-normal distribution, and a particle size is determined which corresponds to a degree of cumulative volume of 90% (D90) in a particle size range set to 0.021 µm as a minimum and to 2000 µm as a maximum in the approximated particle size distribution (horizontal axis, σ). The dispersion liquid contains a surfactant and SN-DISPERSANT 7347-C or Triton X-100 (registered trademark) as a dispersant. Several drops of the dispersant are added to the dispersion liquid. Further, when the sample is floated, SN Wet 366 is added as a wetting agent.

The negative active material layer preferably contains an aqueous binder together with a non-graphitizable carbon.

The aqueous binder contains a polymer.

Examples of the polymer include a copolymer of ethylene and vinyl alcohol, polymethyl methacrylate, polyethylene oxide, polypropylene oxide, polyvinyl alcohol, polyacrylic acid, polymethacrylic acid, and styrene-butadiene rubber (SBR).

The battery can exert a high power for a prolonged period since the negative active material layer contains an aqueous binder.

The negative active material layer may further have a conducting agent such as Ketjen Black (registered trademark), acetylene black and graphite. The negative active material layer of the present embodiment does not have the conducting agent.

In the electrode assembly 2 of the present embodiment, the positive electrode 23 and the negative electrode 24 are wound while being insulated by the separator 25. That is, in the electrode assembly 2 of the present embodiment, a layered body 22 of the positive electrode 23, the negative electrode 24 and the separator 25 is wound. The separator 25 is a member having insulating properties. The separator 25 is arranged between the positive electrode 23 and the negative electrode 24. Thereby, in the electrode assembly 2 (specifically the layered body 22), the positive electrode 23 is insulated from the negative electrode 24. Further, the separator 25 retains an electrolyte solution in the case 3. Thereby, lithium ions move between the positive electrode 23 and the negative electrode 24 which are alternately layered with the separator 25 sandwiched therebetween during charge-discharge of the energy storage device 1.

The separator 25 is band-shaped. The separator 25 is composed of a porous membrane of, for example, polyethylene, polypropylene, cellulose or polyamide. The separator 25 may be formed by disposing an inorganic layer containing inorganic particles such as $SiO_2$ particles, $Al_2O_3$ particles, boehmite (alumina hydrate) or the like on a base material formed of the porous membrane. The separator 25 preferably has the inorganic layer. The battery can exert a high power for a prolonged period since the separator 25 has the inorganic layer. The separator 25 preferably has the inorganic layer at least on a positive electrode side thereof. The separator 25 of the present embodiment is formed of, for example, polyethylene. A width of the separator (dimension in the transverse direction of a band shape) is slightly larger than the width of the covered portion 242 of the negative electrode 24. The separator 25 is arranged between the positive electrode 23 and the negative electrode 24 which are superimposed over each other in a state of being staggered in the width direction so that the covered portions 232 overlap. The uncovered portion 231 of the positive electrode 23 and the uncovered portion 241 of the negative electrode 24 do not overlap each another. That is, the uncovered portion 231 of the positive electrode 23 is protruded toward a width direction from a region where the positive electrode 23 and the negative electrode 24 overlap. The uncovered portion 241 of the negative electrode 24 is protruded toward a width direction (direction opposite to the protrusion direction of the uncovered portion 231 of the positive electrode 23) from a region where the positive electrode 23 and the negative electrode 24 overlap. The electrode assembly 2 is formed by winding the positive electrode 23, the negative electrode 24 and the separator 25 in a layered state. An uncovered layered portion 26 in the electrode assembly 2 is constituted by a section in which only an uncovered portion 231 of the positive electrode 23 or only an uncovered portion 241 of the negative electrode 24 is layered.

The uncovered layered portion 26 is a section to be brought into conduction with a current collector 5. The uncovered layered portion 26 of the present embodiment is divided into two sections with a hollow portion 27 (see FIG. 2) sandwiched therebetween viewed in a direction of a winding axis of wound the positive electrode 23, the negative electrode 24 and the separator 25.

The uncovered layered portion 26 thus constituted is provided for each electrode of the electrode assembly 2. That is, the uncovered layered portion 26 in which only an uncovered portion 231 of the positive electrode 23 is layered, constitutes an uncovered layered portion of the positive electrode in the electrode assembly 2. The uncovered layered portion 26 in which only an uncovered portion 241 of the negative electrode 24 is layered, constitutes an uncovered layered portion of the negative electrode in the electrode assembly 2.

The case 3 has a case main body 31 having an opening and a lid plate 32 which seals (closes) the opening of the case main body 31. The case 3 houses an electrolyte solution together with the electrode assembly 2, the current collector 5 and the like in its internal space 33. The case 3 is formed of a metal that is resistant to the electrolyte solution. The case 3 of the present embodiment is formed of, for example, aluminum based metal material such as aluminum or an aluminum alloy. Alternatively, the case 3 may be formed of a metal material such as stainless steel and nickel, or a composite material prepared by bonding a resin such as nylon to aluminum.

The electrolyte solution is a nonaqueous electrolyte solution. The electrolyte solution is obtained by dissolving an electrolytic salt in an organic solvent. Examples of the organic solvent include cyclic carbonic acid esters such as propylene carbonate and ethylene carbonate; and chain carbonates such as dimethyl carbonate, diethyl carbonate, and ethylmethyl carbonate. Examples of the electrolytic salt include $LiClO_4$, $LiBF_4$, $LiPF_6$ and the like. The electrolyte solution of the present embodiment is one prepared by dissolving 1 mol/L of $LiPF_6$ in a mixed solvent prepared by mixing propylene carbonate, dimethyl carbonate and ethylmethyl carbonate in proportions of 3:2:5.

The lithium ion secondary battery of the present embodiment exerts a high power and exhibits high durability since the negative active material layer includes a non-graphitizable carbon having specific pores.

In addition, the energy storage device of the present invention is not limited to the aforementioned embodiment, and various modifications may be employed within the gist of the invention. For example, to a constitution of an embodiment, a constitution of another embodiment may be added, and a part of a constitution of an embodiment may be replaced with a constitution of another embodiment. Moreover, a part of a constitution of an embodiment may be deleted.

In the aforementioned embodiment, the case in which the energy storage device is used as a nonaqueous electrolyte secondary battery (for example, a lithium ion secondary battery) capable of charging and discharging has been described. However, a kind or a size (capacity) of the energy storage device is arbitrary. Further, in the above embodiment, the lithium ion secondary battery has been described as an example of the energy storage device, but the energy storage device is not limited to this. For example, the present invention is applicable to various secondary batteries as well as primary batteries, and an energy storage device of a capacitor such as an electric double layer capacitor.

The energy storage device (for example, a battery) may be used for an energy storage apparatus (a battery module when the energy storage device is a battery). The energy storage apparatus has at least two energy storage devices 1 and a bus bar member electrically connecting between two (different) energy storage devices 1. In this case, a technology of the present invention may be applied to at least one energy storage device 1.

EXAMPLES

Next, the present invention will be described in more detail by way of examples, but the present invention is not limited to these examples.

A lithium ion secondary battery was prepared by using a positive electrode containing $LiNi_{1/3}Co_{1/3}Mn_{1/3}O_2$ in an active material layer, a negative electrode containing non-graphitizable carbon in an active material layer, and a separator.

Eight types of non-graphitizable carbons having different 90% cumulative diameters (D90) were used for the negative active material.

90% cumulative diameters (D90) of the non-graphitizable carbons are 1.5 μm, 1.9 μm, 3.7 μm, 4.3 μm, 6.5 μm, 8.5 μm, 11.5 μm, and 22.1 μm The negative active material layer was prepared so that using the non-graphitizable carbon, the total volume of the pores having a pore size of 0.1 μm or more and 1.0 μm or less is as follows.

Total volume of the active material layer containing a non-graphitizable carbon are 0.24 $cm^3/g$, 0.26 $cm^3/g$, 0.28 $cm^3/g$, 0.31 $cm^3/g$, 0.34 $cm^3/g$, 0.39 $cm^3/g$, 0.42 $cm^3/g$, 0.43 $cm^3/g$, 0.46 $cm^3/g$, and 0.49 $cm^3/g$ Two types of separators which use only a base substrate (polyolefin porous membrane) and have an inorganic layer formed on a base substrate, were used.

In addition, the separator having the inorganic layer was arranged so that the inorganic layer is located on a positive electrode side.

First, a power at an initial stage of each of the prepared batteries was measured at a charge rate of 50% under a temperature condition of 25° C.

Measuring results of the power of the battery at an initial stage are shown in Table 1.

Then, a durability test was carried out in which this battery was left standing for 90 days under an environment of 75° C. in a state of a charge rate of 100%.

A power of the battery after the durability test was measured at a charge rate of 50% under a temperature condition of 25° C.

Measuring results of the power of the battery after the durability test are shown in Table 2.

Figure 4:
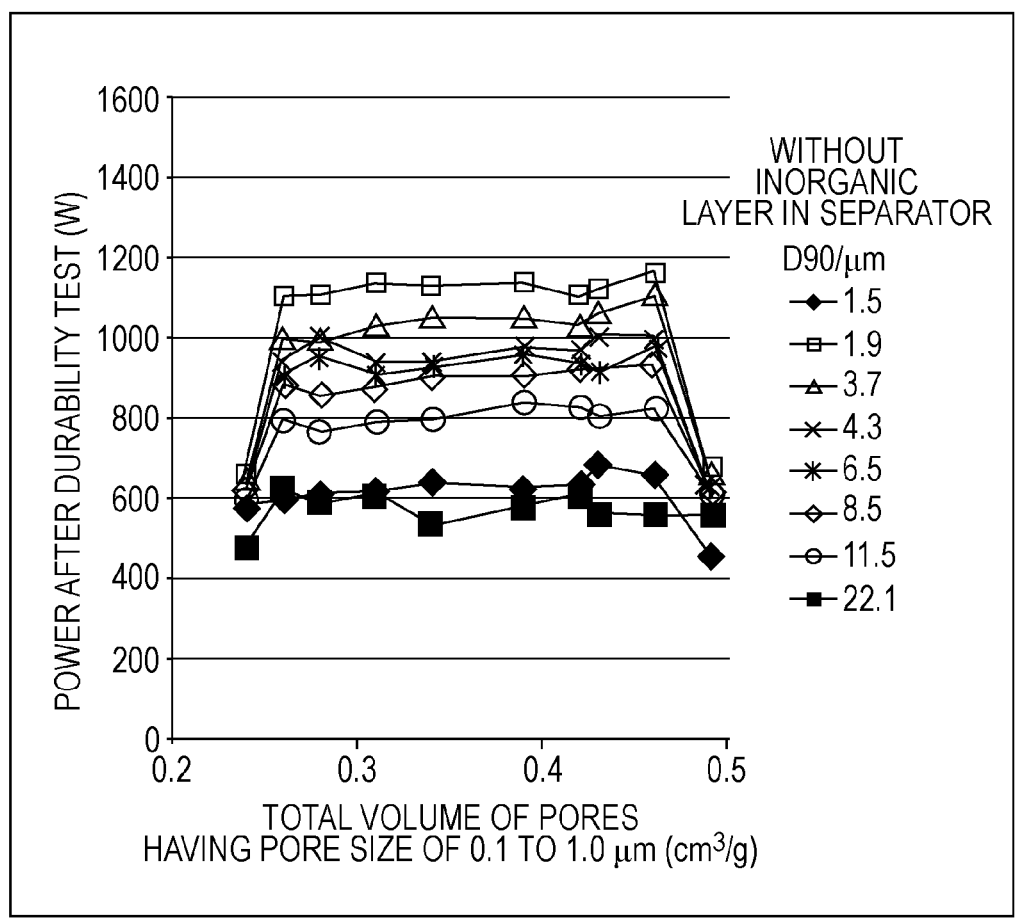
FIG. 4 is a view showing a power after a durability test of a battery that includes a separator not having an inorganic layer. The view shows a relation between a total volume of the pores having a pore size of 0.1 μm or more and 1.0 μm or less in the active material layer and the power after a durability test in various particle sizes (D90) of the non-graphitizable carbon.
Figure 5:
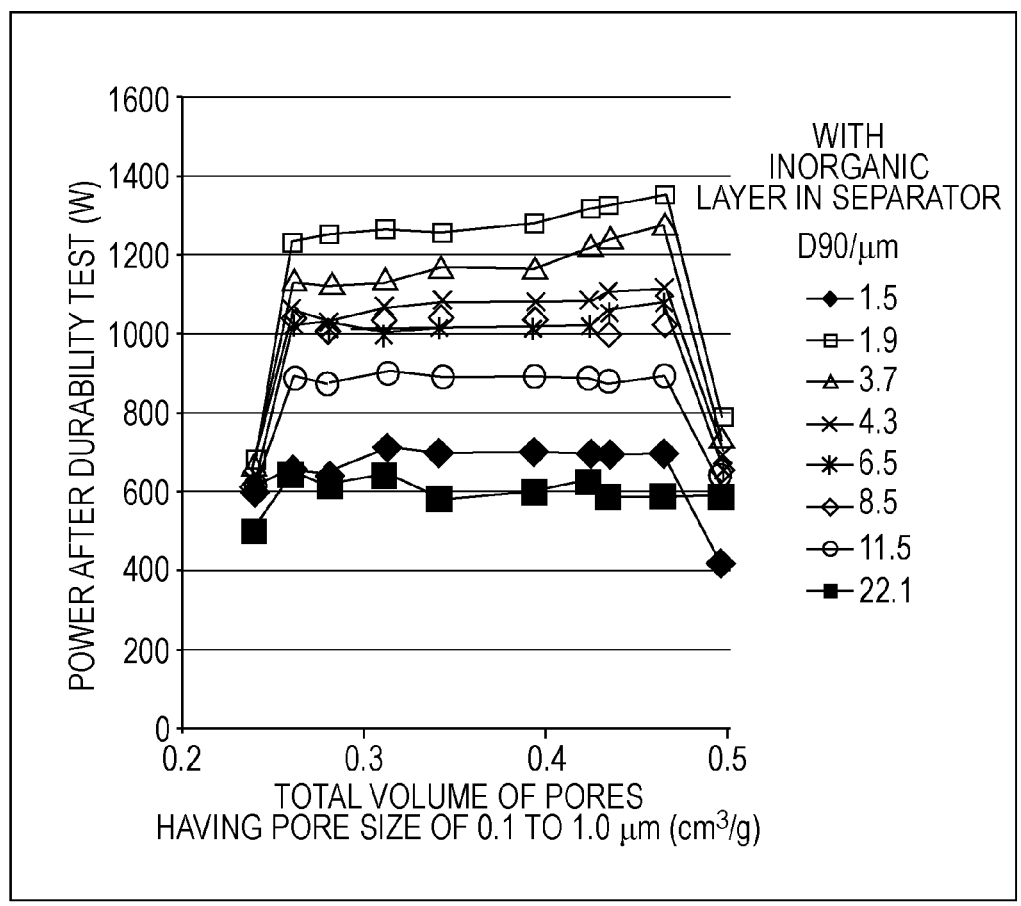
FIG. 5 is a view showing a power after a durability test of a battery that includes a separator having an inorganic layer. The view shows a relation between a total volume of the pores having a pore size of 0.1 μm or more and 1.0 μm or less in the active material layer and the power after a durability test in various particle sizes (D90) of the non-graphitizable carbon.

The results in Table 2 were divided into two cases in which the separator is not provided with an inorganic layer and in which he separator is provided with an inorganic layer, and the divided results are shown in FIGS. 4 and 5.

A power retention obtained by dividing the power after the durability test by the power at an initial stage is shown in Table 3.

TABLE 1

Power at Initial Stage (unit: W)

| Separator | Particle Size: D90 (μm) | Total Volume of Pores Having Pore Size of 0.1 to 1.0 μm ($cm^3/g$) | | | | | | | | | |
|---|---|---|---|---|---|---|---|---|---|---|---|
| | | 0.49 | 0.46 | 0.43 | 0.42 | 0.39 | 0.34 | 0.31 | 0.28 | 0.26 | 0.24 |
| Without Inorganic Layer | 1.5 | 906 | 1513 | 1543 | 1536 | 1547 | 1586 | 1577 | 1604 | 1600 | 1596 |
| | 1.9 | 792 | 1374 | 1375 | 1413 | 1416 | 1420 | 1447 | 1449 | 1462 | 1459 |
| | 3.7 | 736 | 1280 | 1274 | 1281 | 1289 | 1309 | 1314 | 1321 | 1344 | 1354 |
| | 4.3 | 708 | 1135 | 1159 | 1147 | 1170 | 1187 | 1184 | 1198 | 1204 | 1199 |
| | 6.5 | 679 | 1082 | 1087 | 1099 | 1105 | 1124 | 1117 | 1140 | 1145 | 1158 |
| | 8.5 | 651 | 1041 | 1049 | 1062 | 1072 | 1088 | 1086 | 1076 | 1100 | 1092 |
| | 11.5 | 623 | 907 | 909 | 930 | 937 | 943 | 956 | 940 | 963 | 952 |
| | 22.1 | 614 | 617 | 628 | 643 | 653 | 643 | 708 | 696 | 713 | 729 |
| With Inorganic Layer | 1.5 | 933 | 1559 | 1589 | 1582 | 1594 | 1634 | 1624 | 1652 | 1648 | 1644 |
| | 1.9 | 816 | 1415 | 1417 | 1456 | 1459 | 1463 | 1491 | 1492 | 1506 | 1503 |
| | 3.7 | 758 | 1319 | 1312 | 1319 | 1328 | 1348 | 1353 | 1361 | 1384 | 1394 |
| | 4.3 | 729 | 1169 | 1194 | 1182 | 1206 | 1222 | 1219 | 1233 | 1240 | 1235 |
| | 6.5 | 700 | 1115 | 1120 | 1132 | 1138 | 1158 | 1150 | 1174 | 1179 | 1193 |
| | 8.5 | 670 | 1072 | 1081 | 1094 | 1105 | 1120 | 1118 | 1109 | 1133 | 1125 |
| | 11.5 | 641 | 934 | 936 | 958 | 965 | 972 | 985 | 968 | 992 | 980 |
| | 22.1 | 632 | 635 | 647 | 662 | 673 | 662 | 729 | 717 | 735 | 751 |

TABLE 2

Power after Durability Test (unit: W)

| Separator | Particle Size: D90 (μm) | Total Volume of Pores Having Pore Size of 0.1 to 1.0 μm ($cm^3/g$) | | | | | | | | | |
|---|---|---|---|---|---|---|---|---|---|---|---|
| | | 0.49 | 0.46 | 0.43 | 042 | 0.39 | 0.34 | 0.31 | 0.28 | 0.26 | 0.24 |
| BWithout Inorganic | 1.5 | 453 | 651 | 679 | 630 | 619 | 634 | 615 | 609 | 592 | 575 |
| | 1.9 | 674 | 1154 | 1114 | 1102 | 1133 | 1122 | 1129 | 1101 | 1097 | 656 |

TABLE 2-continued

Power after Durability Test (unit: W)

| Separator | Particle Size: D90 (μm) | Total Volume of Pores Having Pore Size of 0.1 to 1.0 μm (cm³/g) | | | | | | | | | |
|---|---|---|---|---|---|---|---|---|---|---|---|
| | | 0.49 | 0.46 | 0.43 | 042 | 0.39 | 0.34 | 0.31 | 0.28 | 0.26 | 0.24 |
| Layer | 3.7 | 640 | 1101 | 1057 | 1024 | 1044 | 1047 | 1025 | 991 | 994 | 636 |
| | 4.3 | 623 | 987 | 997 | 964 | 971 | 937 | 935 | 994 | 939 | 611 |
| | 6.5 | 611 | 963 | 913 | 934 | 951 | 922 | 905 | 946 | 904 | 637 |
| | 8.5 | 579 | 927 | 913 | 914 | 901 | 903 | 869 | 850 | 880 | 612 |
| | 11.5 | 567 | 816 | 800 | 819 | 834 | 793 | 784 | 761 | 790 | 581 |
| | 22.1 | 552 | 555 | 559 | 604 | 575 | 534 | 601 | 585 | 620 | 474 |
| With Inorganic Layer | 1.5 | 420 | 701 | 699 | 697 | 701 | 703 | 715 | 644 | 659 | 603 |
| | 1.9 | 792 | 1359 | 1332 | 1325 | 1284 | 1258 | 1267 | 1254 | 1235 | 684 |
| | 3.7 | 744 | 1281 | 1247 | 1227 | 1168 | 1173 | 1137 | 1129 | 1135 | 665 |
| | 4.3 | 707 | 1122 | 1110 | 1087 | 1085 | 1088 | 1073 | 1036 | 1066 | 640 |
| | 6.5 | 672 | 1082 | 1065 | 1021 | 1023 | 1019 | 1001 | 1033 | 1037 | 665 |
| | 8.5 | 650 | 1030 | 1005 | 1029 | 1038 | 1042 | 1040 | 1020 | 1031 | 640 |
| | 11.5 | 609 | 897 | 880 | 891 | 897 | 894 | 906 | 881 | 893 | 609 |
| | 22.1 | 594 | 591 | 589 | 629 | 599 | 583 | 641 | 620 | 646 | 502 |

TABLE 3

Power Retention (unit: %)

| Separator | Particle Size: D90 (μm) | Total Volume of Pores Having Pore Size of 0.1 to 1.0 μm (cm³/g) | | | | | | | | | |
|---|---|---|---|---|---|---|---|---|---|---|---|
| | | 0.49 | 0.46 | 0143 | 0.42 | 0.39 | 0.34 | 0.31 | 0.28 | 0.26 | 0.24 |
| Without Inorganic Layer | 1.5 | 50 | 43 | 44 | 41 | 40 | 40 | 39 | 38 | 37 | 36 |
| | 1.9 | 85 | 84 | 81 | 78 | 80 | 79 | 78 | 76 | 75 | 45 |
| | 3.7 | 87 | 86 | 83 | 80 | 81 | 80 | 78 | 75 | 74 | 47 |
| | 4.3 | 88 | 87 | 86 | 84 | 83 | 79 | 79 | 83 | 78 | 51 |
| | 6.5 | 90 | 89 | 84 | 85 | 86 | 82 | 81 | 83 | 79 | 55 |
| | 8.5 | 89 | 89 | 87 | 86 | 84 | 83 | 80 | 79 | 80 | 56 |
| | 11.5 | 91 | 90 | 88 | 88 | 89 | 84 | 82 | 81 | 82 | 61 |
| | 22.1 | 90 | 90 | 89 | 94 | 88 | 83 | 85 | 84 | 87 | 65 |
| With Inorganic Layer | 1.5 | 45 | 45 | 44 | 44 | 44 | 43 | 44 | 39 | 40 | 37 |
| | 1.9 | 97 | 96 | 94 | 91 | 88 | 86 | 85 | 84 | 82 | 46 |
| | 3.7 | 98 | 97 | 95 | 93 | 88 | 87 | 84 | 83 | 82 | 48 |
| | 4.3 | 97 | 96 | 93 | 92 | 90 | 89 | 88 | 84 | 86 | 52 |
| | 6.5 | 96 | 97 | 95 | 90 | 90 | 88 | 87 | 88 | 88 | 56 |
| | 8.5 | 97 | 96 | 93 | 94 | 94 | 93 | 93 | 92 | 91 | 57 |
| | 11.5 | 95 | 96 | 94 | 93 | 93 | 92 | 92 | 91 | 90 | 62 |
| | 22.1 | 94 | 93 | 91 | 95 | 89 | 88 | 88 | 86 | 88 | 67 |

The total volume of the active material layer in the aforementioned evaluation was adjusted by changing a linear pressure of a roll press on the prepared active material layer. A relation between the linear pressure and the total volume is shown in Table 4 below.

TABLE 4

| Separator | Particle Size: D90 (μm) | Total Volume of Pores Having Pore Size of 0.1 to 1.0 μm (cm³/g) | | | | | | | | | |
|---|---|---|---|---|---|---|---|---|---|---|---|
| | | 0.49 | 0.46 | 0.43 | 0.42 | 0.39 | 0.34 | 0.31 | 0.28 | 0.26 | 0.24 |
| Without Inorganic Layer | 1.5 | 2 | 3 | 5 | 6 | 8 | 12 | 15 | 17 | 20 | 21 |
| | 1.9 | 2.1 | 4 | 5 | 7 | 10 | 16 | 20 | 21 | 30 | 40 |
| | 3.7 | 5 | 9 | 10 | 10 | 15 | 22 | 28 | 35 | 50 | 60 |
| | 4.3 | 7 | 10 | 11 | 11 | 20 | 29 | 30 | 50 | 60 | 70 |
| | 6.5 | 9 | 12 | 15 | 16 | 21 | 34 | 46 | 63 | 79 | 99 |
| | 8.5 | 10 | 13 | 16 | 18 | 23 | 37 | 50 | 69 | 87 | 109 |
| | 11.5 | 15 | 19 | 25 | 27 | 35 | 56 | 76 | 104 | 130 | 164 |
| | 22.1 | 30 | 38 | 49 | 53 | 70 | 112 | 151 | 208 | 260 | 327 |
| With Inorganic Layer | 1.5 | 2 | 3 | 5 | 6 | 8 | 12 | 15 | 17 | 20 | 21 |
| | 1.9 | 2 | 4 | 5 | 7 | 10 | 16 | 20 | 21 | 30 | 40 |
| | 3.7 | 5 | 9 | 10 | 10 | 15 | 22 | 28 | 35 | 50 | 60 |
| | 4.3 | 7 | 10 | 11 | 11 | 20 | 29 | 30 | 50 | 60 | 70 |

TABLE 4-continued

| Separator | Particle Size: D90 (μm) | Total Volume of Pores Having Pore Size of 0.1 to 1.0 μm (cm³/g) | | | | | | | | | |
|---|---|---|---|---|---|---|---|---|---|---|---|
| | | 0.49 | 0.46 | 0.43 | 0.42 | 0.39 | 0.34 | 0.31 | 0.28 | 0.26 | 0.24 |
| | 6.5 | 9 | 12 | 15 | 16 | 21 | 34 | 46 | 63 | 79 | 99 |
| | 8.5 | 10 | 13 | 16 | 18 | 23 | 37 | 50 | 69 | 87 | 109 |
| | 11.5 | 15 | 19 | 25 | 27 | 35 | 56 | 76 | 104 | 130 | 164 |
| | 22.1 | 30 | 38 | 49 | 53 | 70 | 112 | 151 | 208 | 260 | 327 |

*Numerical values in the table represent a linear pressure, and its unit is [kgf/mm].

As shown above, the non-graphitizable carbon having a smaller 90% cumulative diameter (D90) resulted in a higher power at an initial stage.

Further, with respect to the power at an initial stage, the batteries in which the total volume of the pores having a pore size in the range of 0.1 μm to 1.0 μm is in the range of 0.26 to 0.46 cm³/g, are high.

There was a tendency that the batteries in which the total volume is larger, and the non-graphitizable carbon having a larger 90% cumulative diameter (D90) are high in a power retention.

Then, in the range of the total volume of 0.26 to 0.46 cm³/g, the power at an initial stage was high and the power retention was also high.

Particularly, the case where the non-graphitizable carbon having a 90% cumulative diameter (D90) of 1.9 μm or more and 11.5 μm or less is used as a negative active material, resulted in an high power retention.

The case where the separator having the inorganic layer is used resulted in better results than the case where the separator not having the inorganic layer is used.

It is found from the above descriptions that the energy storage device of the present invention has a high power and high durability.

What is claimed is:

1. An energy storage device comprising:
  a positive electrode;
  a negative electrode; and
  a nonaqueous electrolyte solution,
  wherein the negative electrode includes an active material layer containing a non-graphitizable carbon, and the active material layer has pores having a pore size of 0.1 μm or more and 1.0 μm or less, and a total volume of the pores is 0.26 cm³/g or more and 0.46 cm³/g or less.

2. The energy storage device according to claim 1, wherein a 90% cumulative diameter (D90) in a volume based particle size distribution of the non-graphitizable carbon is 1.9 μm or more and 11.5 μm or less.

3. The energy storage device according to claim 1, wherein a 90% cumulative diameter (D90) in a volume based particle size distribution of the non-graphitizable carbon is 1.9 μm or more and 8.5 μm or less.

4. The energy storage device according to claim 1, wherein a 90% cumulative diameter (D90) in a volume based particle size distribution of the non-graphitizable carbon is 1.9 μm or more and 4.3 μm or less.

5. The energy storage device according to claim 1, wherein a 90% cumulative diameter (D90) in a volume based particle size distribution of the non-graphitizable carbon is 1.9 μm or more and 3.7 μm or less.

6. The energy storage device according to claim 1, wherein the active material layer contains a binder, and the binder is an aqueous binder.

7. The energy storage device according to claim 1, wherein the energy storage device includes a separator arranged between the positive electrode and the negative electrode, and the separator has an inorganic layer.

8. The energy storage device according to claim 1, wherein the energy storage device includes a separator arranged between the positive electrode and the negative electrode, and the separator has an inorganic layer at least on a positive electrode side thereof.

9. The energy storage device according to claim 1, wherein, in the negative active material layer, a packing density of the active material is 0.9 g/cm³ or more and 1.04 g/cm³ or less.

10. An energy storage device comprising:
  a positive electrode;
  a negative electrode; and
  a nonaqueous electrolyte solution,
  wherein the negative electrode includes an active material layer, and the active material layer has pores having a pore size of 0.1 μm or more and 1.0 μm or less, and a total volume of the pores is 0.26 cm³/g or more and 0.46 cm³/g or less.

* * * * *